June 16, 1964

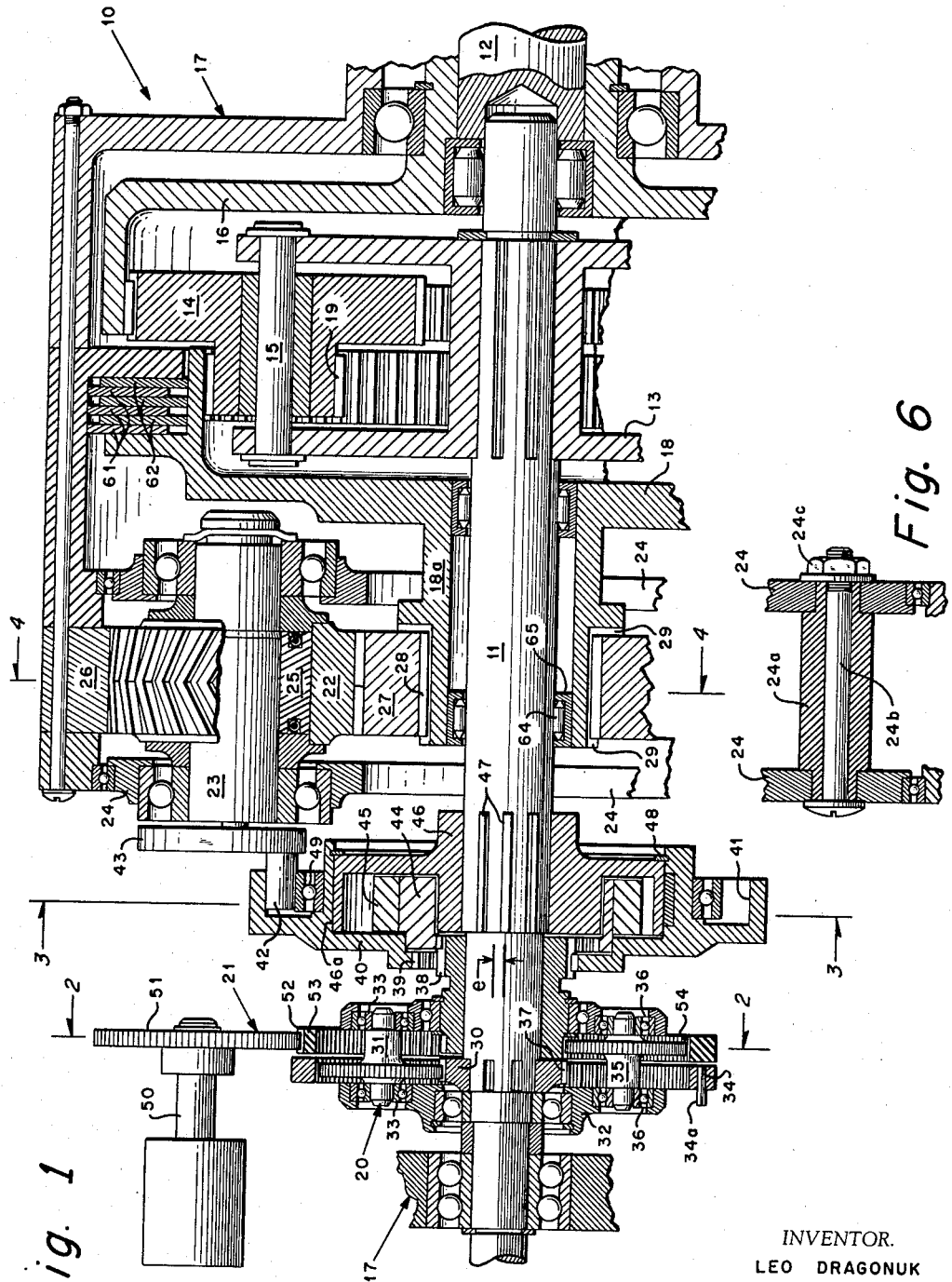

L. DRAGONUK 3,137,180

VARIABLE TRANSMISSION

Original Filed Feb. 11, 1959

INVENTOR.
LEO DRAGONUK

BY

INVENTOR.
LEO DRAGONUK

June 16, 1964     L. DRAGONUK     3,137,180
VARIABLE TRANSMISSION

Original Filed Feb. 11, 1959     4 Sheets-Sheet 4

INVENTOR.
LEO DRAGONUK

BY

3,137,180
VARIABLE TRANSMISSION
Leo Dragonuk, 3168 Mayflower Road,
Plymouth Meeting, Pa.
Original application Feb. 11, 1959, Ser. No. 792,684, now Patent No. 3,013,438, dated Dec. 19, 1961. Divided and this application May 24, 1961, Ser. No. 113,055
5 Claims. (Cl. 74—679)
(Granted under Title 35, U.S. Code (1952), sec. 266)

The invention described herein may be manufactured and used by or for the Government of the United States of America for governmental purposes without the payment of any royalties thereon or therefor.

This invention is a division of application Serial No. 792,684, filed February 11, 1959, U.S. Patent No. 3,013,-438, granted December 19, 1961, for Variable Speed Drive.

This invention relates to a variable speed drive and control means therefor, and more particularly relates to a transmission which is devoid of disengageable clutches effective for shifting gears or otherwise changing the speed of the transmission.

Heretofore there has been a considerable problem involved in obtaining a slip-free and smooth variable speed drive transmission capable of providing a variable speed output from a constant speed input, a constant speed output from a variable speed input, and a variable speed transmission which can also be combined with a variable speed output.

In connection with alternators, which are used to supply electricity for an aircraft and more particularly for an aircraft powered by a variable speed turbine or anothe type engine, a constant speed output tothe alternator is desired although the input speed may be variable. The speed of a turbine may vary, for example, between three and ten thousand r.p.m. Since it is essential, for obvious reasons, to provide a constant speew drive to the alternator, it has generally been found unsatisfactory to provide a transmission which must be entirely disengaged from its drive, such as by means of a clutch, for purposes of changing the gear ratio. Therefore, there has been a need for a variable speed transmission which is devoid of any clutches but which transmission has an adequate speed range to permit the alternator to be driven at a constant speed although the aircraft engine may vary in speed over a considerable range.

Also, it is contemplated that the invention can be used in conjunction with a variable speed input for providing a variable speed output by means of the variable speed transmission.

The invention, which comprises a slip-free variable speed transmission free of any clutches and having a suitable control therefor, is considered to be a solution to the problems of providing a variable speed output from a constant speed input, a constant speed output from a variable speed input, and a variable speed output from a variable speed input such as an internal combustion engine.

It is one of the principal objects of the invention to provide a compact variable speed transmission capable of producing speeds from zero to some maximum in either direction without altering the prime mover speed or its direction of rotation.

Another principal object of the invention is to provide a variable speed transmission and control means therefor capable of maintaining a constant speed output when driven by a variable speed input.

Still another object of the invention is the provision of a mechanical integrator which can be compactly constructed to transmit, without slip, unlimited power.

More particularly, it is an object to provide a variable speed transmission which does not rely upon the use of a clutch which not only may slip, but which even more disadvantageously may at least momentarily disconnect the input from the output, and thereby interrupt the drive.

Another object of the invention is the provision of a transmission in which the speed of the output thereof can be changed smoothly in either direction while the input continues to be driven in only one direction and, if desired, at a constant speed.

Still another object of the invention is to provide a coaxial variable speed transmission capable of varying the output of a constant speed input without interrupting or disconnecting the drive.

Still another object of the invention is to provide a positive variable speed transmission unit, capable of transmitting reasonably unlimited horsepower, controlled by control means of a novel configuration having cam means which can be either manually or automatically operated for varying the speed of the transmission unit.

Yet another object of the invention is to provide a control mechanism for a variable speed transmission devoid of any slip or the ordinarily drive-disconnect type of clutches or couplings and more particularly to provide a transmission of the type described having an output which is controlled by means of an angularly turnable, shiftable, or ratchetable planet gear or a plurality of successively angularly turnable planet gears about a sun gear and/or a ring gear for producing a variable speed output. Also, the speed range may be amplified further by means of other epicyclic or planetary gear trains, for example, so that the over-all effect is that the output is increased or reduced by the angular shifting of the planet gear or gears.

A still further object of the invention is to provide a variable speed transmission control means including planet gear means having controllably shiftable planet gears, the control means having epicyclic gear means statically and dynamically balanced along a common traverse plane. One of the advantages of the control means referred to is that the balancing weight is symmetrically located in substantially the same transverse plane as the epicyclic gear means and not axially spaced relative thereto.

A still further object of the invention is to provide a control mechanism which can be controlled very accurately through epicyclic gear train means and minute movements of the control mechanism may be amplified or stepped down as desired so that a microscopic control of the successive angular increments by which the planet gear on gears are shifted about the sun gear can be effected.

Still another object of the invention is to provide a positive varibale speed and no-slip transmission which is constantly connected to the input and to the output shafts and is capable of providing a smooth transition of speeds in either a positive or negative direction.

More particularly, it is an object of the invention to provide a variable speed transmission and the control means therefor which are substantially coaxial and symmetrically disposed about the input and output shafts and where the variable speed transmission can be adapted to be connected to a planetary gear train in such a manner that a constant speed output can be maintained from a variable speed input, a variable speed output can be obtained from a constant speed input, and/or a variable speed input can be varied as desired.

A further object of the invention is to provide a slip-free variable speed transmission having primary and secondary outputs, the secondary output being variable and adapted to add to or subtract from the output speed of the primary.

Another object of the invention is to provide a slip-free variable speed transmission having primary and secondary outputs, the secondary output being adapted to multiply by variable quantities the output speed of the primary.

The invention further resides in certain novel features of construction, combinations and arrangements of parts, and further objects and advantages of the invention will be apparent to those skilled in the art to which it pertains from the following description of the present preferred embodiments thereof described with reference to the accompanying drawings, which form a part of the specification, and wherein the same reference characters represent corresponding parts throughout the several views, and in which:

FIG. 1 is a fragmentary longitudinal sectional view along a longitudinal axis of a variable speed transmission embodying one form of the invention;

Figure 5:
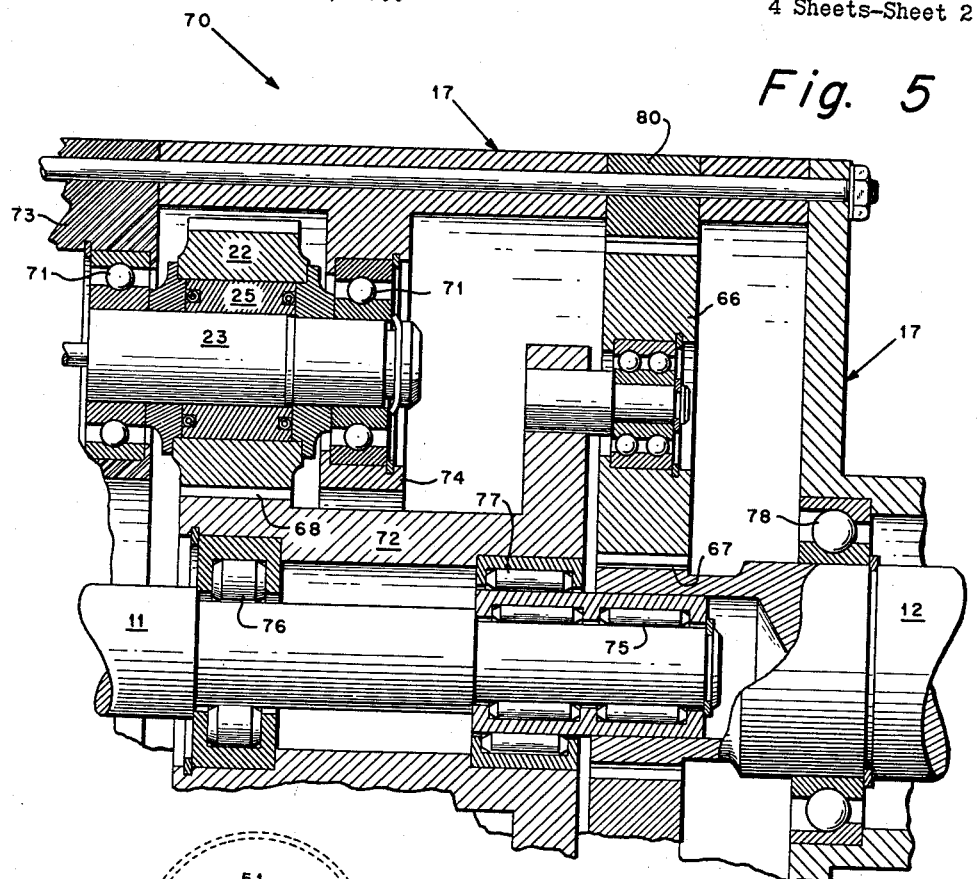

FIG. 5 is a fragmentary longitudinal sectional view of the invention embodied in an epicyclic gear train for providing a stepped down and/or stepped up constant speed output in one direction from a variable speed unidirectional input. More particularly, this embodiment is especially adapted for use in driving an alternator at a constant speed from a variable speed aircraft engine for creating a steady flow of electrical energy; and FIG. 6 is a fragmentary sectional view along line 6—6 in FIG. 3 and shows one of the spacers.

It is to be understood that the invention is not limited to the details of construction and arrangements of parts shown in the drawings and hereinafter described in detail, and is capable of being otherwise embodied and of being practiced or carried out in various ways. Also, the phraseology or terminology employed herein is for the purpose of description and there is no intention to herein limit the invention beyond the requirements of the prior art.

The present invention provides several preferred embodiments of a variable speed transmission, which is almost entirely made up of a plurality or series of epicyclic or planetary gear trains, suitable for use in automotive vehicles as in FIGS. 1-4; for driving alternators at a constant speed from a variable speed input in vehicles such as aircraft, as in FIG. 5.

A variable speed transmission embodying the invention, indicated generally by the reference numeral 10 in FIGS. 1 through 4, comprises an input shaft 11 in tandem with a coaxial output shaft 12. The variable speed transmission 10 further comprises a spider 13 splined on the outer end of the input shaft 11 and carrying a plurality of equiangularly spaced planet gears 14 journaled on axially extending parallel journal pins 15. Preferably, there are three planet gears 14 journaled between two integrally connected parallel, radially extending transverse flanges, which form spider 13. The input shaft 11, by way of the spider 13 and the planet gears 14, drives the output shaft 12 through an internally-toothed ring gear or hub 16 splined to the output shaft 12. Both the input and output shafts 11 and 12 are journaled in a conventional manner in a multipart cylindrical housing, indicated generally by reference numeral 17.

In order to enable the transmission 10, comprising the primary output of planetary gear arrangement 13 and 14 to be a variable speed transmission, a second planetary or epicyclic gear arrangement forming a secondary output, is mounted concentrically about the input shaft 11 so as to add to or subtract from the primary output speed of the planet gears 14 in the instant embodiment.

The planetary gears 14 have their speed of rotation added to or subtracted from by a combined internally-toothed ring gear and axially movable brake actuating member 18 meshing with planet gears 19. The gears 19 are integrally connected to the planet gears 14 but are of reduced diameter relative thereto for changing the speed of the transmission 10. It will be understood that as the combined ring gear and brake member 18 drives the planet gears 14 in a direction the same as or opposite to the direction of the spider 13, the primary output at the ring gear 16 will be changed. Preferably the ring gear member 18, in the instant embodiment, is adapted to only subtract from the primary output of the transmission 10. For example, should the input shaft 11 have an input speed of +1, the output shaft 12 will have an output speed of −1 to +¼, where +¼ represents an output shaft speed of approximately a quarter of the input speed and in the same direction. Consequently, where the instant transmission is especially adapted for use in an automobile, the automobile can be driven, by disregarding the speed ratio of the differential, in a reverse direction at a speed of approximately one quarter the crankshaft speed or driven in a forward direction at approximately the crankshaft speed, which may be as high as 4000 r.p.m. or more.

The ring gear member 18, FIG. 1, is driven from the input shaft 11 by means of a novel override and speed control arrangement 20 and a movable or adjustable cam and planet gear ratcheting or turning control arrangement 21 which can be either manually controlled or preferably automatically or remotely controlled through a servo mechanism.

Figure 3:
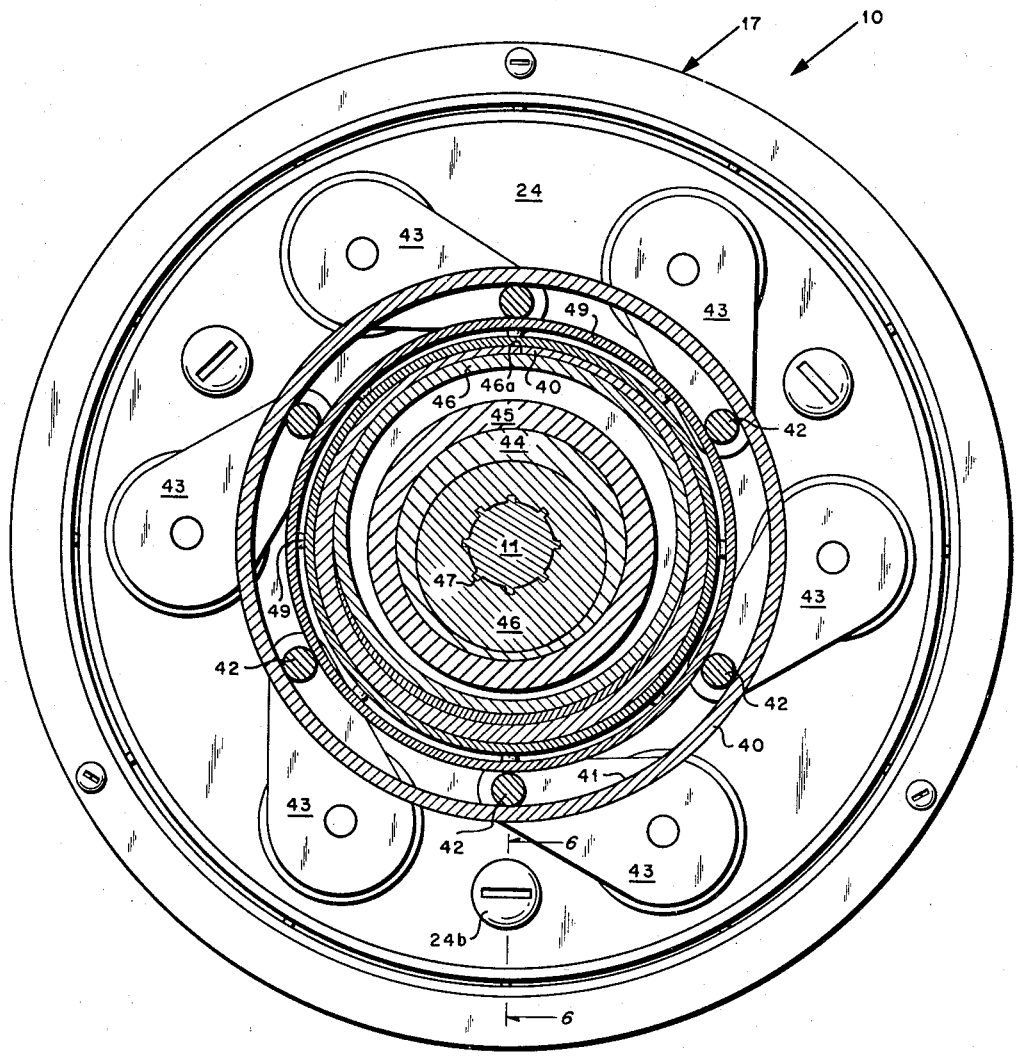
FIG. 3 is a partially sectional view along line 3—3 in FIG. 1.
Figure 4:
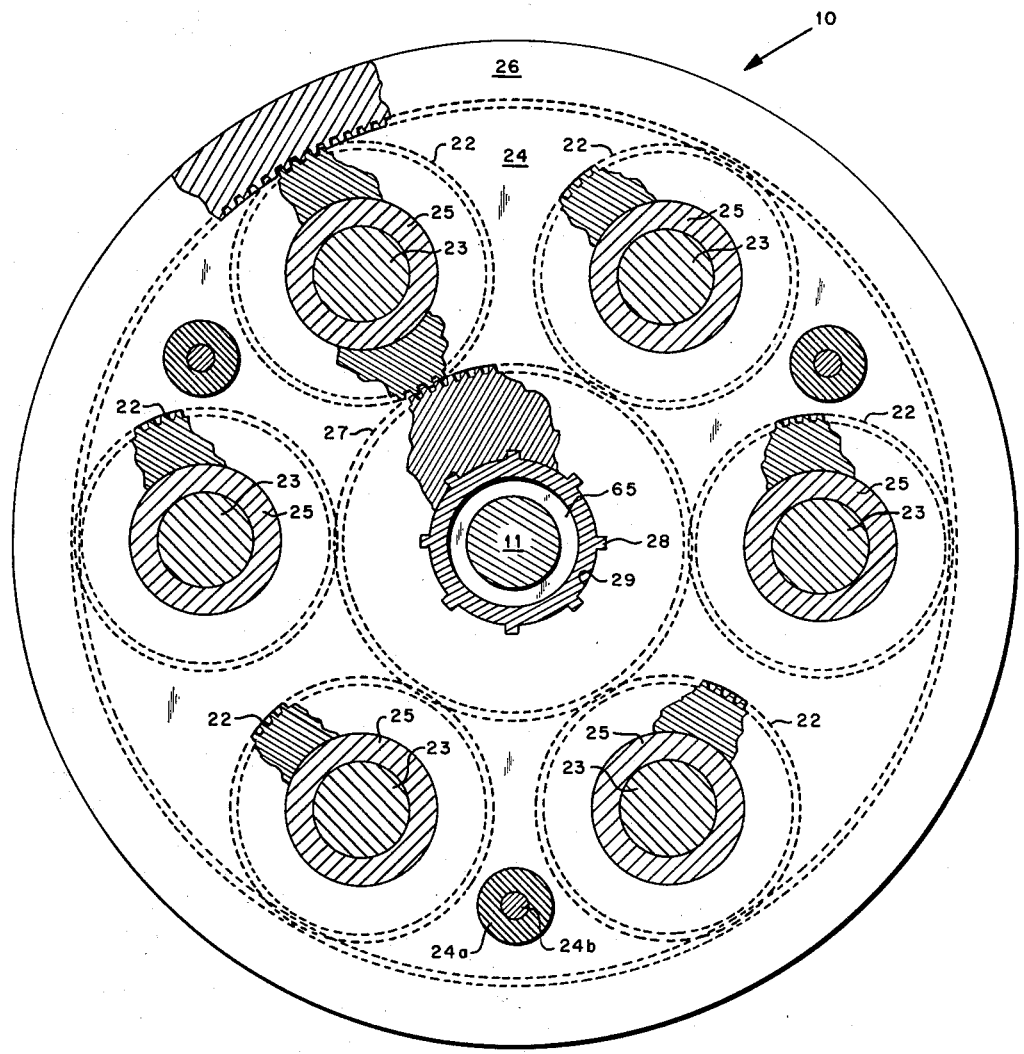
FIG. 4 is a fragmentary sectional view along line 4—4 in FIG. 1.

In order to drive the ring gear member 18 at varying speeds, secondary drive planetary gear means, FIGS. 1, 3 and 4, preferably have six equiangularly spaced ratchetable, angularly shiftable planet gears 22. Preferably, the gears 22 have herringbone teeth and are each carried by an axially aligned shaft 23 journaled in a pair of parallel carrier plates 24. The plates 24 are held in spaced relationship by means of spacer bushing 24a each having a bolt 24b passing therethrough secured in the nut 24c, FIGS. 3 and 9. Each of the ratchetable planet gears 22 are drivingly connected to its respective shaft 23 by means of a unidirectional clutch, such as a Formsprag[1] clutch, indicated generally by the reference numeral 25. The purpose of the unidirectional clutches 25 is to permit the planet gears 22 to be ratcheted in only one direction, a counterclockwise direction, in a manner to be described. Each clutch 25 permits the attached gear 22 to turn freely in a clockwise direction.

Each of the shiftable planetary gears 22 are adapted to mesh with an internally and herringbone toothed fixed-ring gear 26, forming a part of the housing 17, and is in driving connection with an axially movable or shiftable sun gear 27, also having herringbone teeth. The gear 27 is helically splined to a hub portion 18a of the ring gear and brake member 18. The sun gear 27 and the gear member 18 are respectively connected together by mating helical splines 28, 29 so that upon driving the sun gear 27 in one angular direction, the ring gear member 18 will tend to be forced in one of the two opposite axial directions. This will be described in detail later.

More particularly, the shiftable or ratchetable planetaries 22 of the change speed control portion of the variable speed transmission 10 receive a velocity component from the input shaft 11 by means of a sun-like spur gear 30 splined to the shaft 11. A lone planet gear 31 is journaled about the shaft 11 by means of a carrier wheel 32. The lone planetary gear 31 may, alternatively, be accompanied by several other planet gears in case a heavier construction is required. The planet gear 31 is rotatably journaled in the carrier wheel 32 by suitable anti-friction bearings 33. A stationary ring gear 34 fixed ---
[1] Trade name of a product made in Detroit, Michigan.

in the housing 17 by pin means 34a meshes with the planet gear 31 and is coaxial with the input shaft 11.

The carrier wheel 32 drives a second lone follower planet gear 35 which is journaled in the carrier wheel 32 by suitable anti-friction bearings 36. A coaxial sleeve-sleeve-like sun gear 37 is rotatably journaled upon the input shaft 11. The sleeve-like sun gear 37 has coaxial gear 38 of slightly greater pitch diameter integrally formed on its extreme right hand end, FIG. 1. The gear 38 is drivingly engaged with an internally-toothed eccentric epicyclic gear-toothed portion 39 of a control cam disc or plate 40. The cam plate 40 has a closed circuit type of cam groove 41 of an eccentric circular configuration adapted to drivingly engage a plurality of equiangularly spaced crank pins 42 having lever arms 43, preferably six in number, one for ratcheting and angularly shifting each of the planetary gears 22 relative to the axially movable gear 27 and about the fixed ring gear 26. The pins 42 are each connected to the center of each clutch or ratchet shaft 23 by its crank arm 43 for rotating the shafts 23 and accordingly successively driving the planet gears 22 in a counterclockwise direction, FIGS. 3 and 4, but not in a clockwise direction due to the aforementioned unidirectional characteristics of the clutch 25. Since the ring gear 26 is fixed and the planet gears 22 are rotated in a counterclockwise direction, the sun gear 27 and the member 18 are driven in a clockwise direction, the same as the input shaft 11.

Also enmeshed with the gear 38 is a counterbalance comprised of an eccentric and internally-toother epicyclic ring gear 44 having a counterweight 45, of a selected mass, secured thereto. The counterbalance gear 44 is driven at the same speed and direction as the cam plate 40 for statically and dynamically balancing the variable speed control arrangement 21. A hub 46, which is fixed to the input shaft 11 by splines 47, it telescopically disposed in the cam plate 40 and retained therein by means of a snap ring 48. The gear 44 and counterweight 45 are turned within the hub 46 and the plate 40, which are and must be driven at the same angular velocity. The pins 42, extending from the cranks 43, each react against the cylindrical outer race of an anti-friction bearing 49 so that as the cam plate 40 is rotated, the pins 42 will be oscillated outwardly and inwardly to crank the cranks 43 and ratchet the planet gears 22 in a counterclockwise direction. As the gears 22 are advanced, the carrier plates 24 will be carried by the shafts 23 about the shaft 11. The periphery of each of the pins 42 tends to bear outwardly against the outer cylindrical sidewall of the cam groove 41 due to the centrifugal forces generated and are thereby controlled by the contour of both the inner and outer sidewalls. However, preferably, in order to eliminate any counteracting forces, the inner sidewall of the groove 41 is comprised of the outer bearing race of the anti-friction bearing 49, the bearing 49 being secured within the groove 41.

One of the important features of the invention is that each of the herringbone-toothed planetary gears 22 is coaxially mounted about the shafts 23 and are adapted to be ratcheted in a counterclockwise direction by means of the crank pins 42 by rotating the cam plate 40.

Figure 2:
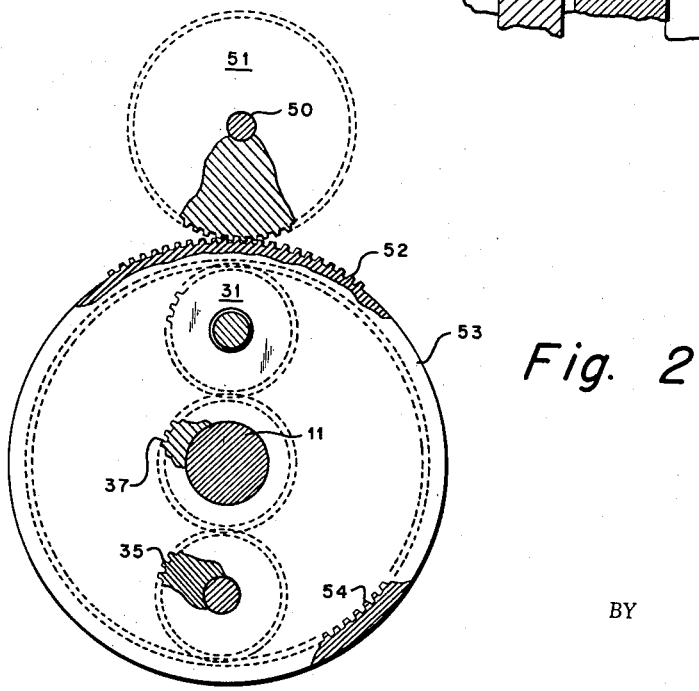
FIG. 2 is a sectional view along line 2—2 in FIG. 1.

The means used for varying the amount in which the cranks 43 are turned or pivoted per revolution of the shaft 11, is preferably embodied in the adjustable control arrangement 21 having a servo motor 50 driving a control pinion 51 which has external teeth enmeshed with a sector of gear teeth 52 in an angularly adjustable outer ring gear 53. The teeth 52, as best shown in FIG. 2, do not generally need to extend completely around the periphery of the movable, but normally relatively stationary, ring gear 53. Preferably, the sector of gear teeth 52 has an arc length of approximately 75 degrees, depending upon the gear ratio between the control gear 51 and the cam plate 40. Ordinarily, the ring gear 53, enmeshed with the gear 51, remains stationary but by moving the ring gear 53 in either direction its internal teeth 54 advances the pinion 35 and the gears 37, 38. Visualizing that the input shaft 11 is stationary, then the only movement given the gear 38 is that caused by the servo 50. At the same time, the relative position of the cam plate 40, driven by the gear 38, is changed by an angle $\phi$ relative to the hub 46. Since the eccentric outer peripheral surface 46a of the hub 46 and the groove 41 of the cam plate are eccentric to the shaft 11 by a maximum distance $e$, the eccentricity $e$ of the circular groove 41 can be varied between zero and some maximum. When the eccentricity $e$ is zero, the angle $\phi$ is preferably zero and the groove 41 has no effective throw. As a result, the crank arms 43 are not moved through an angle. The movement of the crank arms 43 is expressed as an angle $\delta$ and the effective angular movement of the planet gears 22 per revolution of the shaft 11 can therefore be expressed as $$\frac{d\delta}{d\theta}$$

where $\theta$ is the instantaneous input angle of the shaft 11. Since, in the instant embodiment, the maximum speed is the speed of the input shaft although in an opposite direction, it is preferred that at maximum output speed the eccentricity $e$ be zero. Therefore, when the output speed is reduced, the eccentricity $e$ will be increased and at the reverse speed of $+\frac{1}{4}$, the eccentricity $e$ will be a maximum.

The purpose of the override speed control arrangement 20 is to assure that the cam plate 40 will have the same angular velocity as the input shaft 11 so that the relative position of the hub 46 relative to the cam disc 40 or angle $\phi$ will always remain constant and therefore the eccentricity $e$ will remain constant once the adjustment of angle has been effected from servo 50 through the pinion 51, the ring gear 53 and the follower planet gear 35 and the gears 37, 38 to the cam plate 40. If a 1:1 ratio were not assured, it would result in the adjustment by the control arrangement 21 being nullified or otherwise rendered ineffective and result in an uncontrolled constantly changing speed ratio through the planet gears 22 to the ring gear 27, out through the member 18, the pinion gears 14, the ring gear or hub 16, and the output shaft 12.

One of the problems encountered in starting and transferring initial torque from the input shaft 11 to the output shaft 12 in the variable speed transmission 10 results in the input torque or movement through the shaft 11 and the spider 13 to the pinion gears 14 tending to be transferred back and tailing out through the secondary drive means, comprising the member 18 and the planets 22, and resulting in insufficient net torque output to drive the output shaft 12. This is due to the static inertia and load on the output shaft 12 tending to prevent any torque being transferred therethrough. Hence, the output of the input shaft 11 is rendered ineffective since its output would be tailed off, so to speak, through the planets 22. Therefore, a braking arrangement is relied upon to prevent the member 18 from driving the gears 27 and 22 but yet permit the member 18 to be driven by the gears 22 and 27. The braking arrangement includes a stack of brake rings or discs 61 and 62.

The brake rings 61 are keyed to the housing 17 and the brake rings 62, alternately disposed between the rings 61, are keyed to the ring gear and brake member 18. The helical spines 28, 29 extend in a clockwise direction so that any load applied to the ring gear and brake member 18 from the axially movable sun gear 27 results in an axial shifting to the right of the member 18, FIG. 1, and the frictional braking engagement of the brake rings 61, 62. As will now become apparent, the reason for the gears 22, 26 and 27 having continuous herringbone teeth, FIG. 4, is to prevent the axial shifting thereof relative to the member 18. Although it is understood that herringbone teeth are preferred, other types of teeth or equivalent means can be provided or substituted therefor. Also, the member 18 is journaled on the input shaft 11 by suitable anti-friction means, comprising roller bearings 64 and axially spaced apart cylindrical outer races 65, capable of permitting the axial shifting of the member 18.

When the input shaft 11 is turned in the clockwise direction, the output shaft 12 is rotated in the clockwise direction when the eccentricity $e$ is a maximum and in a counterclockwise direction when the eccentricity $e$ is zero, as pointed out. Accordingly, the planet gears 22 are driven in a counterclockwise, FIG. 3, direction and the sum gear is driven in a clockwise direction. The reaction of the hub 18a of the member 18 is then in a left hand direction, as seen in FIG. 1, and the clutch rings 61 and 62 are separated. This permits the driving torque to be transferred from the member 18 to the planet teeth 17 and the planet gears 14. In this manner a proper transfer of driving torque from the input shaft 11 to the output shaft 12 will always be assured without movement being transferred to the secondary via the member 18.

Alternatively and aside from the embodiment described, should it be desired for the secondary to add to the speed of the primary, the member 18 can be driven faster in a clockwise direction, the same direction in which the primary drives the planet gears 14, the counterclockwise rotation of the planet gears 14 will be slowed down and perhaps reversed in direction so that the speed of the output shaft 12 is increased over the speed of the input shaft 11.

Referring to FIG. 5, the invention is shown embodied in a variable speed transmission 70 suitable for driving an alternator off of the output shaft 12 from a variable speed power source, such as an aircraft engine drivingly connected to the input shaft 11. Only the part of the variable speed transmission 10 which has been modified is shown in FIG. 5.

Preferably, the transmission of FIG 5 has a speed range of from two-thirds to twice the speed of the input shaft 11 and in the same clockwise direction at the output shaft 12. This is accomplished by multiplying the angular velocity of a spider-like driving member 72 generally comparable to the brake and ring gear member 18 in FIGS. 1-4 by its directly preferably driving three planetary output gears 66, from the planet gears 22, in a coaxial circular path about the shafts 11 and 12. The output shaft 12 has a power pick-off sun gear 67 on its juxtaposed end that meshes with and is driven by the output gears 66.

There is no adding or subtracting of the output of the shiftable planetary gears 22 as in the embodiment of FIGS. 1-4, for the reason that power is transferred through the secondary override and speed control arrangement 20, FIGS. 1-4, and not directly to the output shaft by way of primary gearing such as the spider 13 and planetary gears 14 of FIGS. 1-4.

The present embodiment of FIG. 5 does not require the use of the herringbone type of gear teeth in the planetaries 22 and the member 72. This is because there is no dual input of power from the primary and the secondary drive, and the resulting tailing-off phenomena cannot arise in the secondary.

More particularly, the planetaries 22 are connected to the planet shafts 23, preferably by the unidirectional ratchet-like clutches 25 as in the preceding embodiment, but the shafts 23 are not moved in a circular path about the input shaft 11 since they are journaled in the housing 17. A sun gear 68, integrally connected to one end of the member 72, is driven by the planet gears 22. In the instant embodiment, each of the planet gears 22 are rotated about their respective shafts 23. Each of the shafts 23 are journaled at the outer ends thereof by means of ball bearings 71 rigidly secured in the housing 17 by means of parallel, transverse, and annular flanges 73, 74 integrally connected thereto.

The output end of the input shaft 11 is coaxially journaled within the adjoining end of the output shaft 12 by means of a tandem or twin needle bearing assembly 75. The member 72 is journaled on the reduced end portions of the input shaft 11 and the outer race of bearing assembly 75 by means of anti-friction roller bearings 76 and needle bearings 77, respectively. Both shafts 11 and 12 are journaled in the housing 17, such as with conventional anti-friction bearing assembly 78, in a manner well understood in the art.

An internally-toothed, stationary ring gear 80 is fixed within the housing 17 and adapted to have its teeth mesh with the planet gears 66. However, where the stationary outer ring gear 26 is shown in FIGS. 1-4, no similar ring is provided in FIG. 5 about the planet gears 22. The effect of the omission of the outer ring gear, such as the ring gear 26, for the planet gears 22 is that the latter must then be ratcheted twice the angular increment than that which would ordinarily be required. The gears 22 in FIG. 5 are ratcheted in a counterclockwise direction while both the input and output shafts 11, 12 are driven in a clockwise direction. Restated, the provision of the internally-toothed ring gear about the planet gears 22 has been found to double the variable speed output caused by the shifting of the planet gear 22 a given angular increment and reduces the required range of the eccentricity $e$ for a given speed range. As is now apparent, the provision of the internally-toothed ring gear for the planet gears 22 can be made optional depending upon the wishes of the user.

It will also be apparent that when the crank arms 43, FIGS. 1-4, are not moved through an angle $\delta$, the angular movement of the planet gears 22 is zero since the term $$\frac{d\delta}{d\theta}$$

is zero. Consequently, in the present embodiment, FIG. 5, the output of the transmission is zero. However, since the output is desired to be two-thirds to twice that of the input, the crank arms 43 will always be moved through some angle, within the minimum angle being designed to give the minimum output speed.

In the embodiment of FIGS. 1-4, when $e$ is a maximum, the output is a minimum of $+\frac{1}{4}$ and when $e$ is zero the output is $-1$ or the same as that of the input shaft 11 although in an opposite direction, as pointed out hereinbefore.

Although it is always preferable to have the eccentricity $e$ zero at maximum output speeds, this is not possible in the embodiment of FIG. 5 where the minimum value of the eccentricity $e$ provides an output of $+\frac{2}{3}$ of the input shaft speed and the maximum value of $e$ provides an output speed of $+2$.

While several specific embodiments of the invention have been shown and described, it is understood that the same are susceptible of many changes and modifications, as known to one skilled in the art, and it is intended to cover such changes and modifications coming within the scope of the appended claims.

What is claimed is:

1. Transmission apparatus comprising: a support member, an input shaft journaled in said member, an output shaft journaled in said member coaxial with and independently rotatable relative to said input shaft, a first spur gear coaxially fixed to said output shaft for rotation therewith, a ring gear fixed to said member coaxial with said spur gear and having internal teeth, planet gears meshing with said ring gear and said spur gear, a carrier journaled in said member coaxial with said input shaft rotatably supporting said planet gears and independently rotatable relative to said input shaft, a cam plate coaxially supported on said input shaft and containing a continuous groove therein progressively positionable between zero eccentricity and maximum eccentricity relative to said input shaft, a second spur gear coaxially fixed to said carrier for rotation therewith, a crank journaled in said support member having its free end slidably engaged in said groove, a drive gear coaxial with said crank and meshing with said second spur gear, ratchet means operatively connected between said crank and said drive gear preventing relative rotation therebetween in one direction, and means for varying the angular position of said cam plate relative to said input shaft to change the eccentricity of said groove relative to said input shaft to thereby change the throw of said crank and the angle through which said drive gear is rotated for each revolution of said input shaft.

2. Transmission apparatus as set forth in claim 1 wherein said varying means comprises: a first sun gear coaxially connected to said input shaft for rotation therewith, a carrier member coaxially disposed about said input shaft for rotation relative thereto, a first ring gear member fixed to said support member coaxial with said input shaft and having internal teeth, first planet gear means rotatably supported by said carrier member and meshing with said first sun gear and said first ring gear member, a second sun gear coaxially disposed about said input shaft and connected to said cam plate for rotation therewith, a second ring gear member coaxially disposed about said input shaft for relative rotation thereto and having internal teeth, a second planet gear means rotatably supported by said carrier member and meshing with said second sun gear and said second ring gear member, and control means for selectively rotating said second ring gear member about the axis of said input shaft whereby said cam plate is angularly displaced relative to said input shaft.

3. Transmission apparatus comprising: a support member, an input shaft journaled in said member, an output shaft journaled in said member coaxial with and independently rotatable relative to said input shaft, a first gear coaxially disposed on said input shaft and rotatable relative thereto, a planetary gear train drivingly connected between said first gear and said output shaft and having its ring gear fixed against rotation, a cam plate coaxially supported on said input shaft and containing a continuous groove therein progressively positionable between zero eccentricity and maximum eccentricity relative to said input shaft, a crank journaled in said support member having its free end slidably engaged in said groove, a second gear coaxially disposed on said crank and meshing with said first gear, ratchet means operatively connected between said crank and said second gear preventing relative rotation therebetween in one direction, and means for varying the angular position of said cam plate relative to said input shaft to change the eccentricity of said groove relative to said input shaft to thereby change the throw of said crank and the angle through which said second gear is rotated for each revolution of said input shaft.

4. Transmission apparatus for producing relative rotation between two shafts comprising: a first gear adapted to be coaxially fixed to one shaft for rotation therewith, a ring gear fixed against rotation coaxial with said first gear and having internal teeth, planet gears meshing with said ring gear and said first gear, a carrier coaxial with said first gear rotatably supporting said planet gears and independently rotatable relative to the one shaft, a cam plate coaxial with said first gear and containing a continuous groove therein progressively positionable between zero eccentricity and maximum eccentricity relative to the other shaft, a second gear coaxially fixed to said carrier for rotation therewith, a crank journaled on a parallel axis displaced from the axis of said first gear and having its free end slidably engaged in said groove, a third gear coaxial with said crank and meshing with said second gear, ratchet means operatively connected between said crank and said third gear preventing relative rotation therebetween in one direction, and means adapted to be operatively connected between the other shaft and said cam plate for varying their relative angular position to change the eccentricity of said groove relative to said other shaft to thereby change the throw of said crank and the angle through which said third gear is rotated for each revolution of the other shaft.

5. Apparatus for varying the relative angular position of two coaxial shafts, comprising: a support member, a first sun gear adapted to be coaxially connected to an input shaft for rotation therewith, a carrier adapted to be coaxially disposed about the input shaft for rotation relative thereto, a first ring gear fixed to said support member and adapted to be coaxial with the input shaft and having internal teeth, a first planet gear rotatably supported by said carrier and meshing with said first sun gear and said first ring gear, a second sun gear adapted to be coaxially disposed about the input shaft and adapted to be connected to an output shaft for rotation therewith, a second ring gear adapted to be coaxially disposed about the input shaft for relative rotation thereto and having internal teeth, a second planet gear rotatably supported by said carrier and meshing with said second sun gear and said second ring gear, and control means operatively connected to said second ring gear adapted for selectivell rotating said second ring gear about the axis of the input shaft whereby the output shaft is angularly displaced relative to the input shaft.

References Cited in the file of this patent
UNITED STATES PATENTS

| | | |
|---|---|---|
| 928,486 | Williams | July 20, 1909 |
| 2,051,783 | Dake | Aug. 18, 1936 |
| 2,204,514 | Schlote | June 11, 1940 |
| 2,653,491 | Creber | Sept. 29, 1953 |
| 2,808,239 | Reiffen | Oct. 1, 1957 |

FOREIGN PATENTS

| | | |
|---|---|---|
| 532,667 | Great Britain | Jan. 29, 1941 |